United States Patent
Bader et al.

(10) Patent No.: US 8,656,808 B2
(45) Date of Patent: Feb. 25, 2014

(54) TRANSMISSION SYSTEM

(75) Inventors: Josef Bader, Friedrichshafen (DE);
Gerhard Birkenmaier, Tettnang (DE);
Andreas Graf, Wahlwies (DE); Kim Führer, Lindau (DE); Kai Heinrich, Waldburg (DE); Frank Gessler, Grünkraut (DE); Klaus Wöhr, Meckenbeuren (DE); Hubert König, Meckenbeuren (DE); Manfred Vetter, Friedrichshafen (DE); Gerhard Höring, Hagnau (DE); Ludger Ronge, Eriskirch (DE); Henrik Schuh, Friedrichshafen (DE); Markus Ulbricht, Tettnang (DE); Mario Steinborn, Friedrichshafen (DE); Karl-Fritz Heinzelmann, Meckenbeuren (DE); Bernhard Walter, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1582 days.

(21) Appl. No.: 11/774,225

(22) Filed: Jul. 6, 2007

(65) Prior Publication Data
US 2008/0006635 A1 Jan. 10, 2008

(30) Foreign Application Priority Data

Jul. 7, 2006 (DE) .................. 10 2006 031 444

(51) Int. Cl.
*F16H 57/02* (2012.01)
(52) U.S. Cl.
USPC ...................................... 74/606 R

(58) Field of Classification Search
USPC ................ 74/473.11, 606 R; 220/367.1; 439/620.21
See application file for complete search history.

(56) References Cited

U.S. PATENT DOCUMENTS

| | | | | |
|---|---|---|---|---|
| 4,271,728 A * | 6/1981 | Wakamatsu | | 477/34 |
| 5,004,086 A | 4/1991 | Petzold et al. | | |
| 5,062,447 A | 11/1991 | Davison, Jr. et al. | | |
| 5,845,544 A * | 12/1998 | Huggins et al. | | 74/606 R |
| 6,015,444 A | 1/2000 | Craft et al. | | |
| 6,695,748 B2 * | 2/2004 | Kopec et al. | | 477/130 |
| 2003/0098204 A1 | 5/2003 | Mogi | | |
| 2003/0127267 A1 | 7/2003 | Kowalvk et al. | | |
| 2005/0065402 A1* | 3/2005 | Moriyama et al. | | 600/133 |
| 2010/0229677 A1* | 9/2010 | Murakami et al. | | 74/606 R |

FOREIGN PATENT DOCUMENTS

| | | | |
|---|---|---|---|
| DE | 88 13 836 U1 | 4/1989 | |
| EP | 0 541 035 A1 | 5/1993 | |
| EP | 0 819 869 A2 | 1/1998 | |
| EP | 0939250 B1 | 9/1999 | |
| EP | 1 239 189 A2 | 9/2002 | |
| EP | 1 329 649 A2 | 7/2003 | |
| JP | 2005125830 A * | 5/2005 | B60R 16/08 |
| WO | 2007/031119 A1 | 3/2007 | |

* cited by examiner

*Primary Examiner* — Vicky Johnson
(74) *Attorney, Agent, or Firm* — Davis & Bujold, PLLC; Michael J. Bujold

(57) ABSTRACT

A transmission system for either a manual shift transmission, an automatic transmission or an automated transmission in which the electrical connections and the pneumatic connections including any ventilation port, for the internal components of the transmission are combined with one another so as to exit the transmission housing via a single unified connection formed in the housing wall of the transmission.

12 Claims, 4 Drawing Sheets

TRANSMISSION SYSTEM

This application claims priority from German patent application serial no. 10 2006 031 444.1 which was filed Jul. 7, 7006.

FIELD OF THE INVENTION

The present invention concerns transmission systems, in particular manual shift transmissions, automatic transmissions or automated transmissions.

BACKGROUND OF THE INVENTION

In transmission systems it is common to provide the transmission with electrical connections, hydraulic connections and/or pneumatic connections for a variety of components, such as auxiliary output drives, clutches, transmission brakes, retarders, shift elements, control elements, etc.

In addition, it is know in the prior art to provide individual components of a transmission system with separate independent venting ports or devices.

A prior art method and a device, for ventilating a transmission to equalize the air pressures that are interior and exterior with respect to the transmission housing, is known from EP 0 939 250 B1, the U.S. equivalent of which is U.S. Pat. No. 6,015,444 to Craft et al. for an APPARATUS AND SYSTEM FOR VENTING A TRANSMISSION. The known transmission venting device comprises a vertically extending portion having a first end, a second end and an intermediate section extending between the first and second ends. The vertically extending portion includes an axially central passageway, that extends from the first end toward into the intermediate portion, and one or more radially extending passageways, that allow fluid communication from the central passageway to an exterior of the vertically extending portion.

The first end of the vertically extending portion has a threaded section such that the ventilation device can be screwed into the transmission. In this manner, the venting device enables ventilation from between the interior and exterior of the transmission housing. The dimensions of the axially central passage prevent a film of lubricant from forming across the central passage. The second end of the vertically extending portion has at least one flat surface enabling torque to be applied to the vertically extending portion to assist in connecting the ventilating device with the transmission housing.

The ventilation device further includes a container portion which is designed to enclose the exterior opening of the radially extending passageway within its interior. The container portion is fixed on the vertically extending portion pipe and includes at least one opening allowing airflow from the radially extending passageway to the exterior of the ventilation device. The container portion houses a filter within its interior to capture any fluid, mist and/or liquid vapour while allowing air to pass therethrough. This enables the interior of the transmission to ventilate to the outside while preventing the passage of transmission fluids therefrom.

U.S. Pat. No. 5,004,086 relates to a clutch assembly for a motor vehicle in which a complex actuating unit is provided with a common inlet(s).

Furthermore, multi-speed transmissions having transmission control elements are known in which a ventilating duct is provided in the housing (see WO 2007/031119 A1). These ducts extend from a transmission recess, formed in the transmission housing to accommodate the transmission control element, to as far as the drive output sensor. The transmission recess also serve as a space for the collection of exhaust air from a pneumatic system of the transmission.

SUMMARY OF THE INVENTION

The purpose of the present invention is to simplify the transmission system by combining the electrical, the hydraulic and/or the pneumatic connections, which enter/exit the transmission, into a single common connector that links the variety of transmission system components that are external of the transmission housing, e.g., one or more pumps, electrical power supplies, air compressor or other pneumatic source(s) to the portions of those components internal of the transmission housing which require such electrical, hydraulic and/or pneumatic input. The common connector may also include a ventilation device that enables a free transfer of air and gases from between the interior and the exterior of the transmission housing. While the ventilation device, at the same time, prevents fluid, dust, dirt or other contaminants and debris from passing between the interior and exterior of the transmission housing.

The inventive common connector simplifies the design of the transmission system by limiting the number of electrical, hydraulic and/or pneumatic opening provided in the transmission housing which must be adequately sealed. The fewer number of passages in the transmission housing also reduces the risk of leakage of matter, i.e., oil and contaminants leaking from the interior to the exterior of the transmission housing while still permitting proper ventilation of the transmission. Such reduction of the number of passages and ventilation apertures also reduces the costs associated with manufacturing and assembling the transmission and the associated control system.

The present invention relates to a transmission assembly comprising: a transmission housing; a plurality of transmission elements being located within the transmission housing and at least some of the plurality of transmission elements require at least one of an electrical connection, a hydraulic connection and a pneumatic connection to facilitate operation thereof; a side wall of the transmission housing having a common connector provided therein, and each one of the plurality of transmission elements, which require at least one of an electrical connection, a hydraulic connection and a pneumatic connection, to facilitate operation thereof, being coupled to the common connector to facilitate operation and control of the transmission via at least one control component located outside the transmission housing.

DETAILED DESCRIPTION OF THE INVENTION

Figure 1:
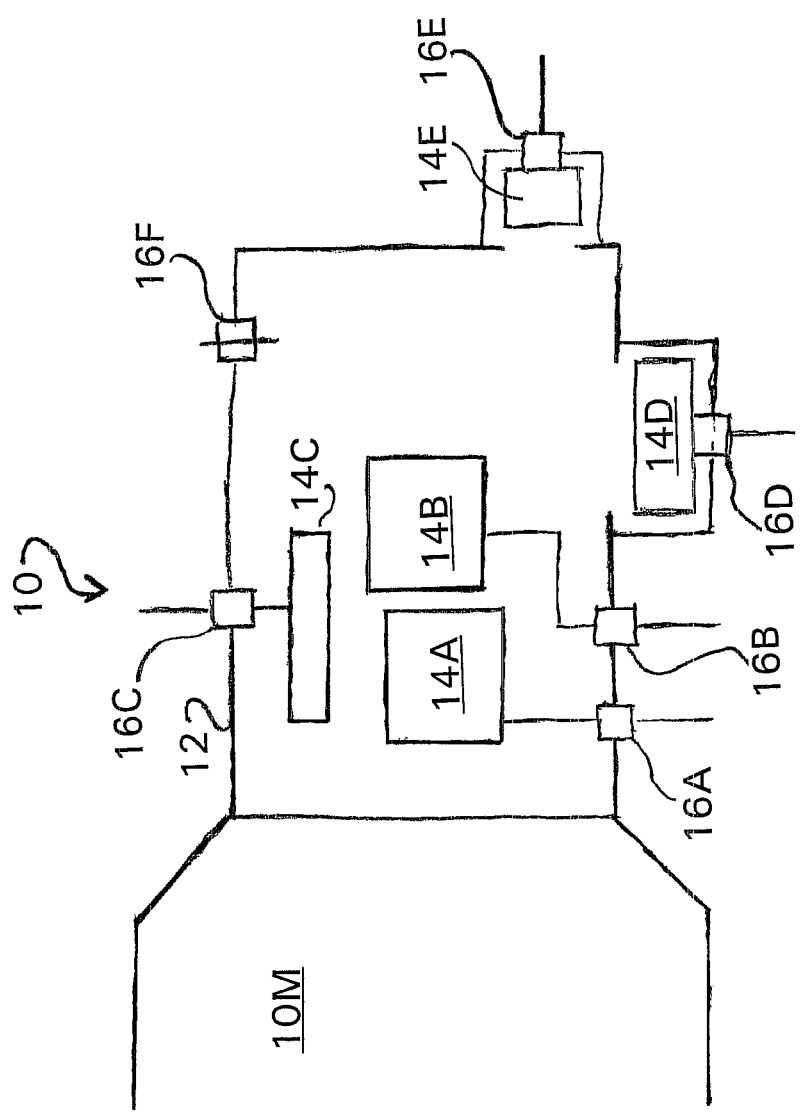
FIG. 1 is a diagrammatic illustration of a prior art transmission having separate electric, air and/or hydraulic connections for the associated transmission components such as an auxiliary output drive, a retarder, a shift element or control elements.

Referring to FIG. 1, therein is shown a diagrammatic illustration of a conventional transmission assembly 10 of the prior art that is associated with a motor 10M and includes a transmission housing 12 and one or more associated or related transmission components or elements, such as a transmission shift element(s) 14A, a transmission control elements 14B, transmission cooling paths 14C, an auxiliary output drive 14D, a retarder 14E, and so on. As indicated, a conventional transmission assembly 10 of the prior art includes a plurality of separate connectors 16A-16E including a gas vent 16F, as described in U.S. Pat. No. 6,015,444, extending through corresponding openings in transmission housing 12 to provide separate electrical, hydraulic and/or pneumatic connections for the various transmission components or elements 14.

To overcome this drawback of having a plurality of separate component openings in the transmission housing of the prior designs, the inventive transmission system of the present invention combines the variety of electrical connections, and hydraulic and/or pneumatic connections for the various transmission system components or elements into a single connection through the exterior transmission housing wall 22. These components include, for example, an auxiliary output drive(s), a retarder(s), a shift element(s), a control element(s), a starting element, a transmission brake(s), a transmission clutch(es), etc. The respective connections for each of these transmission system components or elements can be combined into a single common connector 26 which supplies all of the necessary electrical, hydraulic and/or pneumatic connections, for all of the internal transmission elements, via this single common connector 26.

In addition, the individual vents needed for adequate ventilation of the transmission and the transmission system components and/or for equalization of the internal pressures and the external pressures of each of the transmission and the transmission system components can be combined and vented through a single central vent.

Figure 2:
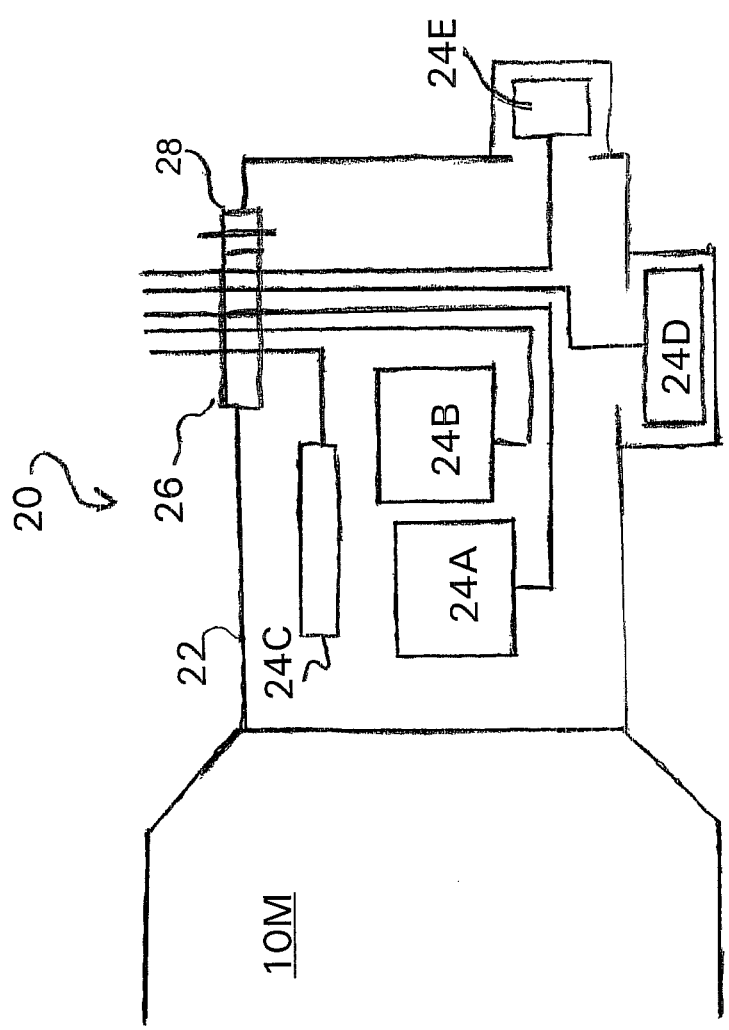
FIG. 2 is a diagrammatic illustration of a transmission, according to the teachings of the present invention, having a single connector for supplying any necessary electrical, hydraulic and/or pneumatic connection(s) to the associated transmission element(s)

FIG. 2 is a diagrammatic illustration of a transmission assembly 20, of the present invention, that includes a transmission housing 22 and a plurality of associated or related transmission elements, such as a transmission shift element(s) 24A, a transmission control element(s) 24B, a transmission cooling path(s) 24C, an auxiliary output drive(s) 24D, a retarder(s) 24E, and so on. In accordance with the present invention, however, the transmission assembly 20 includes at least one combined connector 26 that provides all of the associated electrical, hydraulic and/or pneumatic connections, for the various transmission elements 24A-E, via a single common connector 26 provided in the transmission housing wall 22.

According to the present invention (see FIGS. 3 and 4), the combined or common connector 26 generally includes a single vent 28 that facilitates transmission and/or equalization of a gas and/or air pressure within the transmission. As there is only a single opening within the transmission housing 22 that communicates with the supply devices, such as a hydraulic pump, an air compressor, an air pump or some other hydraulic or pneumatic source 32, a power supply 34, etc., which are located outside of the transmission 20, only that single unified common connection 26 must be adequately sealed, in a conventional manner, to facilitate the supply of all of the necessary electrical, hydraulic and/or pneumatic inputs to the various internal transmission system components and elements 24A-E. The central vent 28 can be optimally designed, for example, as a hose vent an inlet/outlet end 58 which is located within the cabin or other enclosed compartment of the vehicle. It will be appreciated, however, that a given transmission assembly may possibly include two or more combined or common connectors 26 if the design of the transmission assembly 20 prevents the use of only a single combined connector 26, with the resulting advantageous accruing from a reduction in the number of connections and openings into the transmission assembly housing 12.

Figure 3:
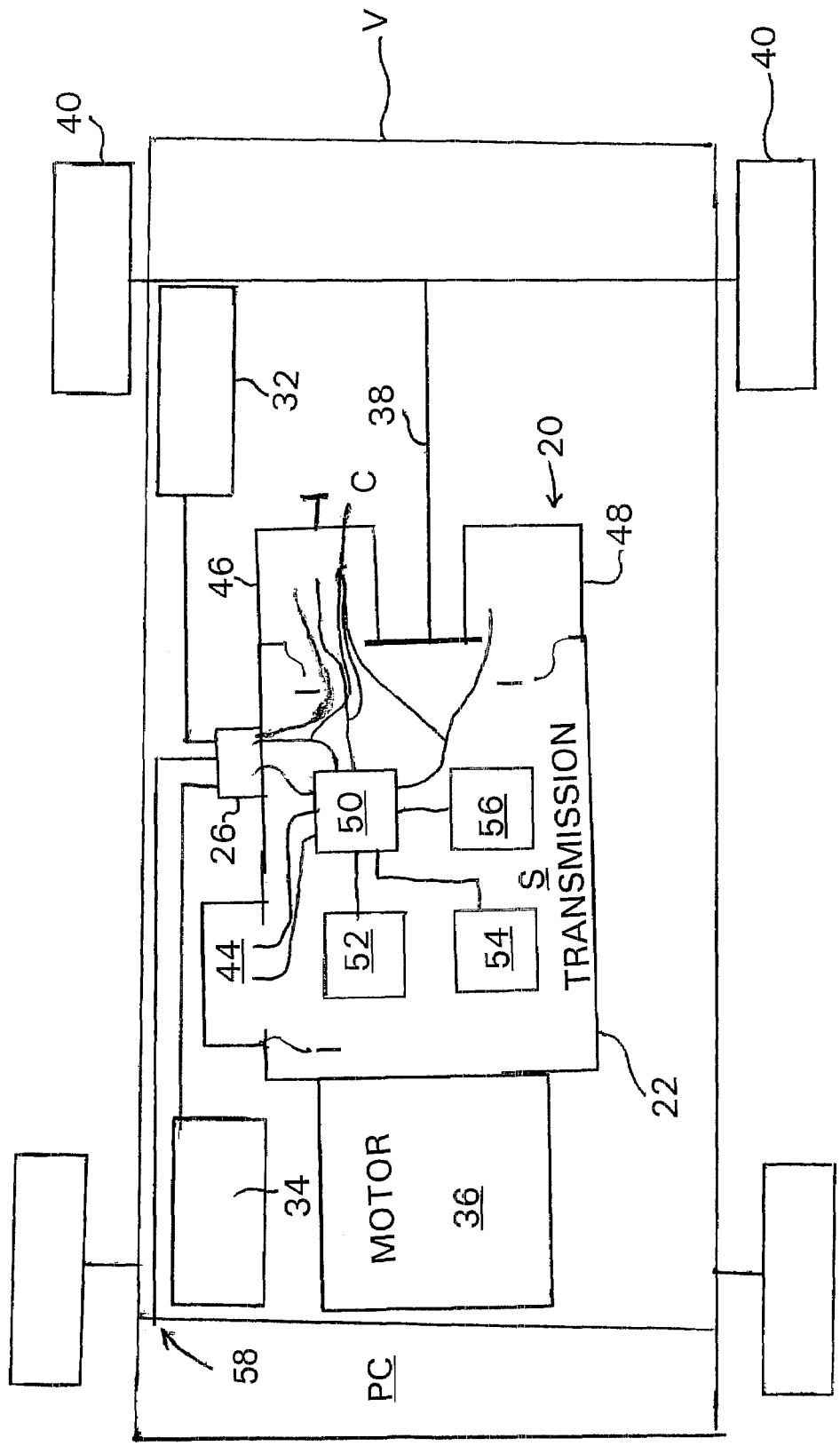
FIG. 3 is a diagrammatic illustration of a second embodiment of a transmission having a single connector to facilitate connection of any necessary electrical, hydraulic and/or pneumatic connection(s) to the associated transmission element(s)

With reference to FIG. 3, a second embodiment of the invention is shown. According to this embodiment, one end of the transmission 20 is coupled, in a conventional manner, to an engine or motor 36 to provide driving power to the transmission 20, while the opposite end of the transmission 20 is coupled, in a conventional manner, to a drive shaft 38 for driving a pair of wheels 40 of the vehicle V, for example, in a conventional manner. According to this embodiment, the transmission controller 44 is mounted externally of the transmission housing 22 but directly communicates with the interior space S of the transmission, via a sealed interface I with the transmission housing 22, so that any necessary electrical, hydraulic and/or pneumatic lines or connections C can be made with the interior space S of the transmission 20 via that sealed interface I. Alternatively, it is possible for the transmission controller 44 to be located completely within the transmission housing 22.

According to this embodiment, both a power take off (PTO) 46 and a retarder 48, for example, are each mounted partially externally of the transmission housing 22, in a conventional manner, so as to communicate directly with the interior space S of the transmission 20, via a sealed interface I with the transmission housing 22, so that any necessary electrical, hydraulic and/or pneumatic line(s) or connection(s) C can be made with the interior space S of the transmission via the respective sealed interfaces I. As with the previously embodiment, the interior space S of the transmission also accommodates a plurality of conventional transmission components or elements, for example, a central connection 50, one or more transmission shift element(s) 52, the transmission controller 44, a transmission cooling path(s) (not separately numbered), an auxiliary output drive(s) 46, a retarder(s) 48, a transmission clutch 54, a transmission brake 56, etc.

Each of the necessary transmission components or elements, e.g., the transmission controller 34, the power take off 36, the retarder 38, the transmission shift element(s) 52, the a transmission controller 44, the transmission cooling path(s), any auxiliary output drive(s) 46, the transmission clutch 54, the transmission brake 56, etc., which require one of an electrical, a hydraulic and/or a pneumatic connection(s) C are each coupled, either directly or indirectly, with the common connector 26 to facilitate the supply of electrical power and/or hydraulic and/or pneumatic fluid thereto.

Figure 4:
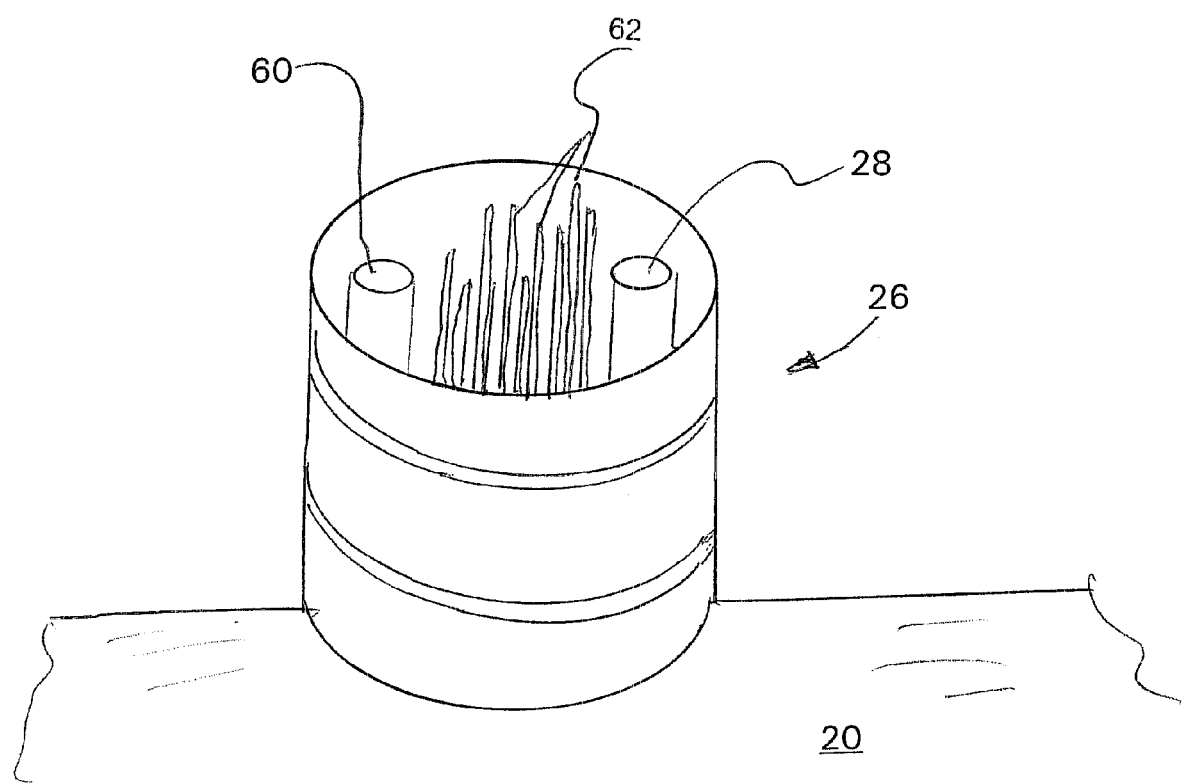
FIG. 4 is a diagrammatic illustration of one embodiment of the single connector according to the present invention.

FIG. 4 is a diagrammatic enlarged illustration showing one embodiment of the single common connector 26, according to the present invention, mounted to the wall of the transmission. As can be seen in this figure, the common connector 26 has a plurality of electrical pins 62 which facilitate the supply of electrical power to the various internal transmission elements contained within the transmission 20, e.g., each electrical pin is connected, via internal wires within the transmission, to the desired transmission element. In addition, the common connector 26 includes a (pneumatic) fluid supply inlet 60 which is connected, either directly or via the central connection 50, to the desired transmission element(s) to supply pneumatic fluid thereto and a single vent 28 is provided for venting the supplied pneumatic fluid from the transmission after use thereof.

According to one aspect of the invention, the outlet/inlet end 58 of a hose vent, coupled to the central single vent 28 of the common connector 26, communicates with either a passenger compartment or some other enclosed compartment or cabin PC of the vehicle V so as to shelter the outlet/inlet end 58 of the single vent 28 from the exterior environment and reduce the possibility of any contaminant(s) or debris entering into the transmission via the single vent 28.

The inventive transmission system is beneficial in that assembly and installation in the vehicle is simplified. Additionally, the reliability of the total transmission system is enhanced since there is only a single unified connection for the various transmission components.

Since certain changes may be made in the above described common connector, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A transmission assembly comprising:
   a transmission housing,
   at least two transmission elements selected from the group consisting of transmission shift elements, transmission control elements and transmission cooling paths, the at least two transmission elements being contained within the transmission housing; and
   a single common connector passing through the transmission housing facilitating a connection between each of the at least two transmission elements contained within the transmission housing and control elements located outside of the transmission housing for controlling the at least two transmission elements, and at least one air or hydraulic pump supplying fluid though the common connector being spaced from the common connector;
   the common connector including at least two electrical lines, a gas vent, and at least one of hydraulic and pneumatic lines.

2. A transmission assembly comprising:
   a transmission housing;
   a plurality of transmission elements being located within the transmission housing, the transmission elements comprising at least two transmission elements selected from the group consisting of a central connection, a transmission shift element, a transmission controller, a transmission cooling path, an auxiliary output drive, a retarder, a transmission clutch, and a transmission brake, at least two of the plurality of transmission elements each requiring at least one of an electrical connection, a hydraulic connection and a pneumatic connection to a corresponding control element located outside of the transmission housing to facilitate operation thereof;
   a side wall of the transmission housing having a single common connector provided therein, each one of the plurality of transmission elements which requires at least one of the electrical connection, the hydraulic connection and the pneumatic connection to at least one corresponding control component located outside the transmission housing to facilitate operation thereof being coupled to the corresponding at least one control component located outside the transmission housing through at least one corresponding connection of a plurality of connections through the single common connector, the plurality of connections through single common connector including connections selected from electrical lines, a gas vent, hydraulic lines and pneumatic lines, and
   at least one air or hydraulic pump supplying fluid through the common connector being spaced from the common connector.

3. The transmission assembly for one of a manual shift, an automatic and an automated transmission according to claim 2, wherein the at least one control component located outside the transmission housing comprises at least one of:
   the hydraulic pump,
   an air compressor,
   the air pump,
   a pneumatic source, and
   a power supply,
   which is located externally of the transmission housing and communicates with the common connector.

4. The transmission assembly for one of a manual shift, an automatic and an automated transmission according to claim 2, wherein the common connector includes a central vent for venting at least two of the plurality of transmission elements.

5. The transmission assembly for one of a manual shift, an automatic and an automated transmission according to claim 1, wherein an outlet/inlet end of a hose vent, coupled to the central vent of the common connector, communicates with in a cabin of the vehicle.

6. A transmission assembly comprising:
   a transmission housing having a side wall having only a central connection opening therein;
   a plurality of transmission elements being located within the transmission housing, the transmission elements comprising a plurality of transmission elements selected from the group consisting a central connection, a transmission shift element, a transmission controller, a transmission cooling path, an auxiliary output drive, a retarder, a transmission clutch, and a transmission brake, at least two of the plurality of transmission elements each requiring at least one of an electrical connection, a hydraulic connection and a pneumatic connection to a corresponding control element located outside of and separate from the transmission housing to facilitate operation thereof;
   a single common connector located within and sealing the central connection opening and vented to permit ventilation of transmission oil while minimizing transmission oil leakage from the transmission, each one of the plurality of transmission elements which requires at least one of an electrical connection, a hydraulic connection and a pneumatic connection to at least one corresponding control component located outside of and separate from the transmission housing to facilitate operation thereof being coupled to the corresponding at least one control component located outside of the separate from the transmission housing through at least one corresponding connection of a plurality of connections through the single common connector, the plurality of connections through single common connector including connections selected from at least two of electrical lines, a gas vent, hydraulic lines and pneumatic lines; and
   at least one air or hydraulic pump supplying fluid through the common connector being spaced from the common connector.

7. The transmission assembly for one of a manual shift, an automatic and an automated transmission according to claim 6, wherein the at least one control component located outside the transmission housing comprises at least one of:
- the hydraulic pump,
- an air compressor,
- the air pump,
- a pneumatic source, and
- a power supply, which is located externally of the transmission housing and communicates with the single common connector.

8. The transmission assembly for one of a manual shift, an automatic and an automated transmission according to claim 6, wherein the single common connector includes a central vent for venting at least two of the plurality of transmission elements.

9. The transmission assembly for one of a manual shift, an automatic and an automated transmission according to claim 7, wherein an outlet/inlet end of a hose vent, coupled to the central vent of the single common connector, communicates with a cabin of the vehicle.

10. The transmission assembly for one of a manual shift, an automatic and an automated transmission according to claim 7, wherein the single common connector includes a central vent for venting at least two of the plurality of transmission elements.

11. The transmission assembly for one of a manual shift, an automatic and an automated transmission according to claim 10, wherein an outlet/inlet end of a hose vent, coupled to the central vent of the single common connector, communicates with a cabin of the vehicle.

12. The transmission assembly for one of a manual shift, an automatic and an automated transmission according to claim 6, wherein the single common connector comprises a pneumatic supply inlet which is connected to at least one transmission element to supply fluid thereto, a single vent is provided for venting the supplied pneumatic fluid from the transmission, and a plurality of electrical pins facilitate supply of electrical power to the internal transmission elements contained within the transmission.

\* \* \* \* \*